US 6,570,915 B1

(12) United States Patent
Sweitzer et al.

(10) Patent No.: US 6,570,915 B1
(45) Date of Patent: **\*May 27, 2003**

(54) DSL AUTO BAUD

(75) Inventors: Ralph F. Sweitzer, San Diego, CA (US); Dean E. Rasmussen, San Diego, CA (US); Mickey C. Rushing, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/629,563

(22) Filed: Jul. 31, 2000

Related U.S. Application Data

(60) Provisional application No. 60/197,047, filed on Apr. 14, 2000, and provisional application No. 60/166,028, filed on Nov. 17, 1999.

(51) Int. Cl.[7] .......................... H04B 17/00; H04B 3/46; H04Q 1/20
(52) U.S. Cl. ..................... 375/225; 375/354; 370/503
(58) Field of Search ............................. 375/222, 219, 375/224, 225, 259, 354, 358; 370/468, 503, 507; 341/61

(56) References Cited

U.S. PATENT DOCUMENTS

| | | | | |
|---|---|---|---|---|
| 4,780,883 A | * | 10/1988 | O'Connor et al. | 370/468 |
| 5,541,955 A | | 7/1996 | Jacobsmeyer | |
| 5,987,061 A | * | 11/1999 | Chen | 375/222 |
| 6,044,107 A | * | 3/2000 | Gatherer et al. | 375/222 |
| 6,130,882 A | * | 10/2000 | Levin | 370/252 |
| 6,167,034 A | * | 12/2000 | Langberg et al. | 370/281 |
| 6,215,793 B1 | * | 4/2001 | Gultekin et al. | 370/464 |
| 6,219,378 B1 | * | 4/2001 | Wu | 375/231 |
| 6,246,695 B1 | * | 6/2001 | Seazholtz et al. | 370/468 |
| 6,272,652 B1 | * | 8/2001 | Starr | 714/701 |

FOREIGN PATENT DOCUMENTS

| | | | | |
|---|---|---|---|---|
| EP | 0 806852 A2 | * | 11/1997 | H04L/5/14 |
| WO | WO 98/59476 | * | 12/1998 | H04L/27/26 |

OTHER PUBLICATIONS

Chen, Walter Y: "DSL: Simulation Techniques and Standards Development for Digital Subscriber Line Systems" 1988, MacMillan, Indianapolis, Indiana, USA XP002166042.

* cited by examiner

*Primary Examiner*—Jean Corrielus
(74) *Attorney, Agent, or Firm*—Farjami & Farjami LLP

(57) ABSTRACT

A DSL communication system including a DSL transmission unit at a central office (DTU-C) and a DSL transmission unit at a remote location (DTU-R) in communication over a communication link. DTU-C and DTU-R are capable of transmitting and receiving packets of data prior to synchronization or training. DTU-C transmits a discovery message to DTU-R and awaits receiving a discovery response message from DTU-R. After receiving the discovery response message, DTU-C transmits a probe message to DTU-R followed by a probe signal. DTU-R measures the line quality while receiving the probe signal. After receiving the probe signal, DTU-R transmits a probe signal to DTU-C, using which signal DTU-C measures the line quality. After transmitting the probe signal, DTU-R transmits a probe response message, including line quality measurements performed by DTU-R. DTU-C and DTU-R may negotiate a first data rate by transmitting data rate messages based on the line quality measurements. DTU-C and DTU-R synchronize or train at the first data rate. After synchronization, DTU-C and/or DTU-R measure the line quality at the first data rate. The line quality may be measured based on bit-error-rate, attenuation level and/or signal-to-noise ratio. A second data rate is then selected based on the line quality measurements. DTU-C may then initiate a rate change request, according to which DTU-C and DTU-R may re-synchronize at the second rate.

68 Claims, 10 Drawing Sheets

DSL AUTO BAUD

RELATED APPLICATIONS

The present application claims the benefit of United States provisional application Ser. No. 60/166,028, filed Nov. 17, 1999. The present application further claims the benefit of United States provisional application Ser. No. 60/197,047, filed Apr. 14, 2000. The present application is also related to United States application Ser. Nos. 09/629,565 and 09/629,564, entitled "DSL Pre-Synchronization Auto Baud" and "DSL Post-Synchronization Auto Baud", respectively, filed concurrently with the present application. All above-mentioned applications are hereby fully incorporated by reference in the present application.

BACKGROUND OF THE INVENTION

1. Field of the Invention

The present invention relates generally to communication systems. More particularly, the present invention relates to Digital Subscriber Line ("DSL").

2. Background

With the tremendous and emerging growth in various areas depending on data communications, such as Internet access, LAN access, broadcast TV, home shopping and video on demand, the need to provide faster data communication speeds has become crucial. However, traditional technologies such as analog modems have failed to provide the desired increase in speed and as a result more and more users are moving towards new technologies, such as DSL, which provides fast connection speeds. DSL refers to a class of technology used to obtain more bandwidth over existing telephone lines. Some DSL implementations also allow simultaneous voice and high-speed data.

FIG. 1 illustrates an example block diagram of a DSL communication system 100. The communication system 100 provides a communication link between a CPE ("Customer Premises Equipment") 110, such as a personal computer, at one end and a computer network, such as an ISP ("Internet Service Provide") 145, at the other end. As shown, the communication between the CPE 110 and the ISP 145 occurs via copper wires or local loops 125 that terminate at the central office ("CO") on the telephone company side and, at the other side, reach out to every home and business. The CO is the front line of the telecommunications network and may be described as a network node on the PSTN ("Public Switched Telephone Network").

As further shown in FIG. 1, DSL technology is used in the communication system 100 to deliver communication services to the CPE 110 via the local loop 125. DSL can support a wide variety of high-bandwidth applications, such as high-speed Internet access, telecommuting, virtual private networking and streaming multi-media content. The end-to-end DSL-based communication system 100 includes the following sub-components: the CPE 100, the remote DSL Transmission Unit ("DTU-R") 120, the central DSL Transmission Unit ("DTU-C") 135 and the ISP 145.

DSL is a digital form of data communications that dramatically increases the digital capacity of ordinary telephone lines or the local loops into the homes or offices. Digital communication is the exchange of information in binary form Unlike an analog signal, a digital signal does not use continuous waves to transmit information. Instead, DSL transmits data using discrete signals, for example, on and off states of electrical current. DSL provides an always-on operation in which digital data does not travel through the Public Switched Telephone Network ("PSTN"), but instead, at the CO, digital data is aggregated in a DSL Access Multiplexer ("DSLAM") and forwarded to the appropriate ISP or data network. DSL has many flavors. High Bit Rate DSL ("HDSL") is a symmetric technology, which provides the same transmission rate in both downstream and upstream directions. Symmetric DSL ("SDSL") is an HDSL variation that uses only one cable pair and is offered in a wide range of speeds from 144 Kbps to 1.5 Mbps. SDSL is a rate adaptive technology. Asymmetric DSL ("ADSL") is a DSL flavor that shares the same line as the telephone, since it uses higher frequencies than the voice band. A version of ADSL is known as G.lite. Other flavors of DSL include Rate Adaptive DSL ("RADSL") that adjusts speed based on line quality, Very High Bit Rate DSL ("VDSL") that is an asymmetric version used as the final drop from a fiber optic junction, and ISDN DSL ("IDSL"). The specifications for these and other flavors of DSL are hereby incorporated by reference.

The CPE 110 may contain one or more PCs or workstations. Typically, multiple PCs reside on a LAN. The gateway to the external network can be a dedicated hardware, such as a router or a PC server acting as a router or proxy server. The DSL system at the CPE 110 side (or the DTU-R 120) and the DSL system at the central site (or DTU-C 135) form a DSL access network and are connected via the local loop 125. As shown, the access multiplexer system and the central site modems are usually combined into a single unit or DSLAM 130. As further shown, the communication system 100 may also use a Layer-2 protocol, such as Asynchronous Transfer Mode ("ATM") at the two ends of the DSL access network, namely modules 115 and 140. Like packet switching for data, ATM integrates the multiplexing and switching functions and allows communications between devices that operate at different speeds. The most basic service building block is the ATM virtual circuit, which is an end-to-end connection that has defined end points and routes but does not have bandwidth dedicated to it. Bandwidth is allocated on demand by the network as users have traffic to transmit. ATM is a set of international interface and signaling standards defined by the International Telecommunications Union ("ITU") that is hereby incorporated by reference.

One major drawback of the conventional DSL communication systems, such as the communication system 100, is that it takes a very long time to establish a connection between DTU-C 135 and DTU-R 120 at an optimal rate. Using DSL techniques, the training time is longer the slower the speed is. For example, with a line speed of 160 Kbps, the training may take about 60 seconds, whereas at a line speed of 1,552 Kbps, the training time may be reduced to about 11 seconds. Conventionally, in order to achieve an optimal data rate, DSL providers utilize a brute force technique, which requires training at a low rate and re-training at higher data rates, one by one, until the optimal rate is determined. However, such technique is extremely undesirable, as it is extremely time consuming and may take about 5 to 10 minutes before the optimal rate may be determnined.

Another shortcoming of the conventional DSL communication systems is the pre-configuration of DTU-C 135 and DTU-R 120 at customer requested speeds, e.g., 160 Kbps, 192 Kbps and 384 Kbps. As a result, if the customer decides to change the requested speeds, the DSL provider will have to manually reconfigure DTU-C 135 and DTU-R 120 by dispatching technicians, which is costly and time consuming.

Accordingly, there is an intense need in the art to reduce the DSL communication systems initial training time, training time for achieving an optimal data rate and providing efficient remote configuration and discovery capabilities.

SUMMARY OF THE INVENTION

In accordance with the purpose of the present invention as broadly described herein, there is provided method and system for DSL auto baud or automatic data rate selection.

According to one embodiment of the present invention, a DSL communication system includes a DTU-C and a DTU-R in communication over a communication link. DTU-C and DTU-R are capable of transmitting and receiving packets of data prior to synchronization or training. In one embodiment, a "1" data bit is represented by 50 ms of scrambled two level ones and a "0"data bit is represented by 50 ms of off-time. DTU-C transmits a discovery message to DTU-R and awaits receiving a discovery response message from DTU-R. After receiving the discovery response message, DTU-C transmits a probe message to DTU-R followed by a probe signal. DTU-R measures the line quality while receiving the probe signal. After receiving the probe signal, DTU-R transmits a probe signal to DTU-C, using which signal DTU-C measures the line quality. After transmitting the probe signal, DTU-R transmits a probe response message, including line quality measurements performed by DTU-R. In one embodiment, the line quality may be based on attenuation level and/or signal-to-noise ratio. At this point, DTU-C and DTU-R may negotiate a first data rate by transmitting data rate messages based on the line quality and/or based on other information that may be exchanged between DTU-C and DTU-R. DTU-C and DTU-R synchronize or train at the first data rate. After synchronization, DTU-C and/or DTU-R measure the line quality at the first data rate. In one embodiment, the line quality may be measured based on bit-error-rate, attenuation level and/or signal-to-noise ratio. A second data rate is then selected based on the line quality measurements. In one embodiment, DTU-C may initiate a rate change request, according to which DTU-C and DTU-R may re-synchronize at the second rate. In one embodiment, the second rate may be several data rates higher or lower than the first data rate.

In another embodiment, DTU-C and DTU-R may measure the line quality at the second data rate and start a re-synchronization process at a third data rate based on the line quality. In yet another embodiment, DTU-C and DTU-R may re-synchronize at several different data rates until an optimal data rate is achieved.

These and other aspects of the present invention will become apparent with further reference to the drawings and specification, which follow.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present invention may be described herein in terms of functional block components and various processing steps. It should be appreciated that such functional blocks may be realized by any number of hardware and/or software components configured to perform the specified functions. For example, the present invention may employ various integrated circuit components, e.g., memory elements, digital signal processing elements, logic elements, and the like, which may carry out a variety of functions under the control of one or more microprocessors or other control devices. In addition, those skilled in the art will appreciate that the present invention may be practiced in any number of data communication contexts and that the communication system described herein is merely one illustrative application for the invention. Further, it should be noted that the present invention may employ any number of conventional techniques for data transmission, signaling, signal processing and conditioning, and the like. Such general techniques that may be known to those skilled in the art are not described in detail herein.

It should be appreciated that the particular implementations shown and described herein are merely examples and are not intended to limit the scope of the present invention in any way. Indeed, for the sake of brevity, conventional encoding and decoding, signal detection or transmission, training, and other functional aspects of the data communication system (and components of the individual operating components of the system) may not be described in detail herein. Furthermore, the connecting lines shown in the various figures contained herein are intended to represent some examples of functional relationships and/or physical couplings between the various elements. It should be noted that many alternative or additional functional relationships or physical connections may be present in a practical communication system.

Figure 1:
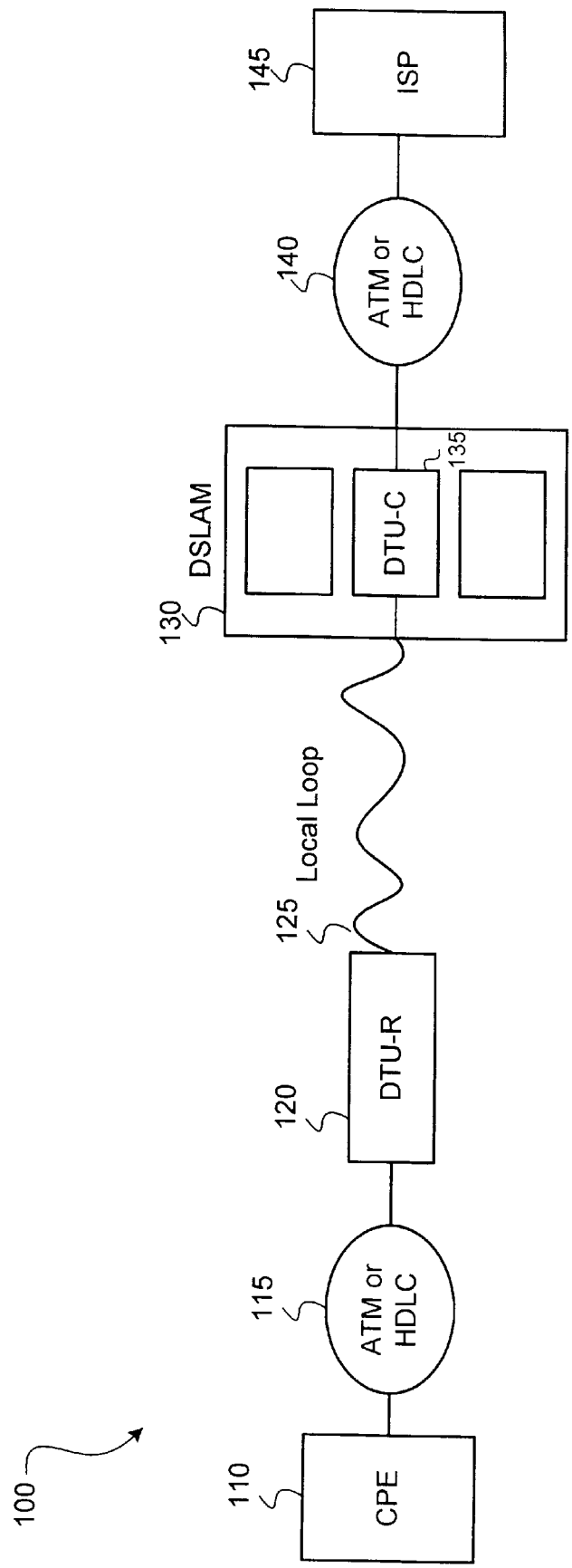
FIG. 1 illustrates a prior art block diagram of a DSL communication system.
Figure 2:
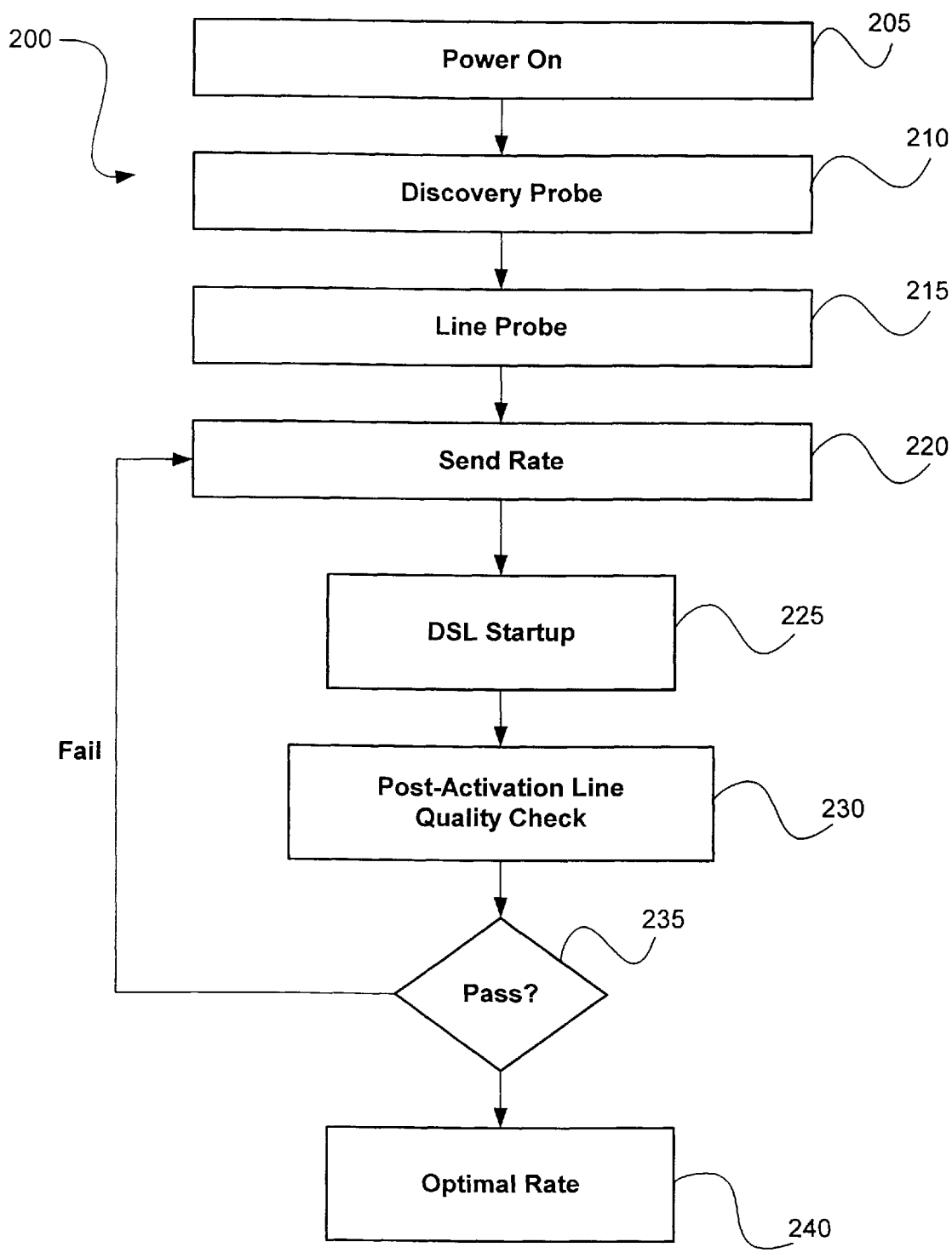
FIG. 2 illustrates an example flow diagram of a communication method according to one embodiment of the present invention.

Now, turning to FIG. 2, flow diagram 200 is used to describe various steps of a-method according to one embodiment of the present invention to achieve an optimal rate between the DTU-R 120 and DTU-C 135 in FIG. 1. The DSL connection process, after the power on step 205, between DTU-C and DTU-R may be categorized into three phases. The first phase is a pre-activation phase, which includes a discovery probe 210 transaction, a line probe transaction 215 and a send rate transaction 220. The second phase is an activation or startup phase 225, in which phase DTU-C and DTU-R synchronize or train over a communication link for passing data. The third phase is a post-activation phase 230, through which the communication link quality is checked and if the link quality passes predetermined conditions at step 235, an optimal rate 240 is determined and at which rate DTU-C and DTU-R may re-synchronize and transfer data.

Figure 3:
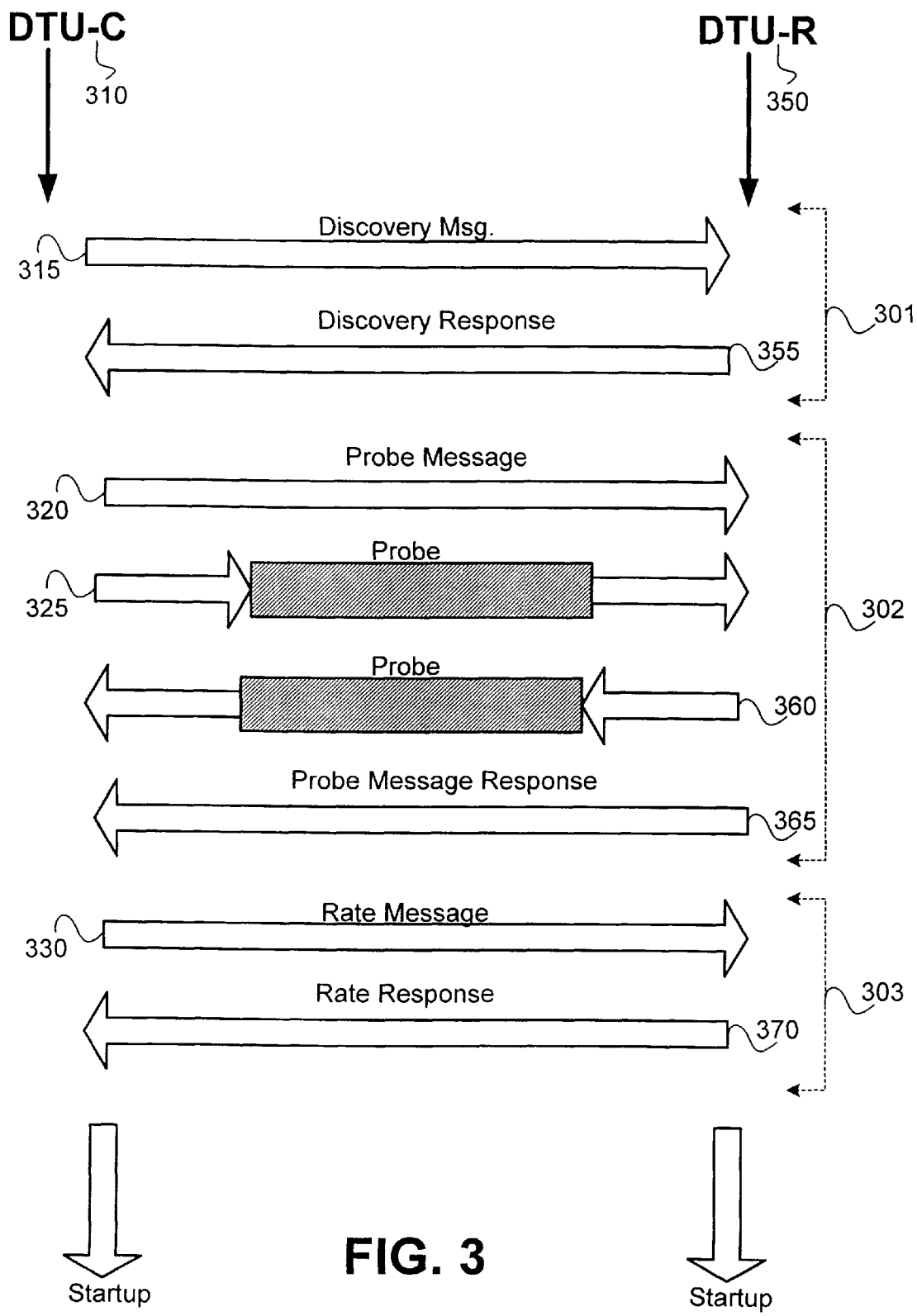
FIG. 3 illustrates example messages exchanged during a pre-synchronization phase according to one embodiment of the present invention.

Referring to FIG. 3, the pre-synchronization phase is described as follows. In one embodiment, DTU-C 310 acts as a master while DTU-R 350 responds as a slave. Communications in the pre-synchronization phase between DTU-C 310 and DTU-R 350 is a half-duplex protocol using bursts of energy. In one embodiment, the transmission and reception rate may default to 160 Kbps. This data rate, however, may be reprogrammed via an application program interface ("API") command to other speeds, such as 144 Kbps, 192 Kbps or 208 Kbps. As shown, the transactions between DTU-C 310 and DTU-R 350 may be classified as a discovery transaction 301, a line probe transaction 302 and a rate transaction 303.

In one embodiment, during each transaction, messages and responses are passed between DTU-C 310 and DTU-R 350 in packets. Each packet includes 32 bits of information that are preceded by a START bit used for synchronization purposes. Each packet is transmitted and received MSB (most significant bit) to LSB (least significant bit) aligned. In one embodiment, each packet has three distinct segments: a checksum segment (bits 0–7), an opcode segment (bits 8–15) and a data field segment (bits 16–31). As described, each packet may contain four 8-bit bytes, wherein the checksum segment contains one byte, the opcode segment contains one byte and the data field segment contains two bytes. Each bit is represented as a 50 ms energy level. In other words, a "1" bit is 50 ms of scrambled two level ones and a "0" bit is represented by 50 ms of off-time, i.e., no energy is transmitted. In one embodiment, the receiving unit samples data about four times faster than the transmitting unit transmits data, in other words, the receiving unit samples data at 12.5 ms. The receiving unit uses a voting scheme to distinguish between "1" and "0". The voting scheme may be used to protect data integrity against a timing skew. In one embodiment, if signal level meter ("SLM") is above a threshold for three out of four samples, the bit is a "1" or else it is a "0". The acquired bit is then shifted MSB aligned. SLM measures the noise margin or the signal-to-noise ratio ("SNR"). In short, SLM provides how far away the actual signal is compared to the detector thresholds.

As stated above, each packet starts by transmitting a START or a "1" bit indicating the beginning of the packet. When the START bit is received, the receiving unit starts sampling for the next 32 bits of data. The receiving unit receives the data packet MSB first and computes the checksum. In one embodiment, the transmitting unit may calculate the checksum using the following formula: [high data field byte (bits 24–31)+low data field byte (bits 16–23)+opcode byte (bits 8–15)]. At the other end, the receiving unit samples the 32 bits of data and computes the checksum using the same formula. If the checksum is valid, the receiving unit decodes the opcode segment and takes an appropriate action. If the checksum is invalid, the receiving unit informs the transmitting unit by sending a NAK packet in response.

In one embodiment, using the above-described packets, DTU-C may remotely configure DTU-R. For example, the previously configured data rates of DTU-R may be remotely reconfigured and various commands may be issued to DTU-R. Furthermore, in some applications, layer 2 information may be passed through DTU-R to a remote entity which provides DSL customer interoperability at layer 2.

Turning back to FIG. 3, the pre-synchronization process begins with the discovery phase 301 where DTU-C 310 acts as the master by transmitting a discovery message 315 to DTU-R 350. The discovery message 315 has a packet format as described above. DTU-C builds the discovery message 315 by inserting a discovery opcode in bits 8–15, inserting a discovery data field in bits 16–31 and calculating and inserting a checksum in bits 0–7. One purpose of the discovery information may be to identify DTU-C 310. For example, the discovery information may be used to identify the device type. Other information may include the payload type, etc. Once DTU-R 350 receives the START bit, DTU-R starts sampling the 32 bits of data. If the checksum is invalid, the discovery message 315 is rejected and DTU-R 350 transmits a NAK to DTU-C 310. DTU-R 350 further checks the discovery information to determine whether the device type is supported. If the device type is not supported by DTU-R 350, DTU-R 350 may not respond and let DTU-C 350 time out and terminate the pre-synchronization process.

If the checksum is valid, DTU-R 350 decodes the opcode bits 8–15 and in return starts building a discovery response 355 by inserting a discovery opcode in bits 8–15, inserting discovery information in bits 16–31 and calculating and inserting a checksum in bits 0–7. As part of its discovery information, DTU-R 350 inserts its device type. If DTU-C 310 does not recognize DTU-R's 350 device type, DTU-C 310 re-sends the discovery message. The discovery information may be used in the rate phase 303 in determining the startup rate. For example, the device type may indicate to DTU-C 310 what rates are supported by DTU-R 350.

In some embodiments, the discovery phase may be used by itself to determine whether a DTU-R exists at the other end and/or whether the DTU-R 350 is connected properly. For example, an operator at the CO may send the discovery message 315 to determine whether the DTU-R 350 is connected properly to the line at the other end. As a result, within a few seconds, the operator may determine that a communication link exists between DTU-C 310 and DTU-R 350. In one embodiment, a remote operator may monitor activities by DTU-R during the discovery phase and inform the central office of such activities. For example, the remote operator may notice that DTU-R LEDs are blinking during the discovery phase. Furthermore, in some embodiments, DTU-C 310 and DTU-R 350 may exchange several discovery messages during the discovery phase 301.

Referring back to FIG. 3, at the end of the discovery phase 301, the pre-synchronization process enters the probe phase 302 when DTU-C 310 sends a probe message 320 to DTU-R 350. The probe message 320 is a 32-bit packet, as described above, with a probe opcode in bits 8–15 indicating to DTU-R 350 that DTU-C 310 is about to send a probe signal 325. One purpose of the probe signal 325 is for the DTU-R 350 to perform some measurements, such as determining the line length and line quality. The probe signal 325 includes about one second of energy split into 500 ms of on-time and 500 ms of off-time. DTU-R 350 uses the probe signal to sample far-end level meter ("FELM") and SLM. FELM provides an approximation of the loop attenuation. While the probe signal 325 is on, FELM and SLM may be sampled at 10% intervals. At the end of the on-time, the sum of the samples is averaged up to 40%. While the probe signal 325 is off, the SLM is sampled and averaged at 10% intervals, and then summed and averaged. The FELM average is used to calculate the line attenuation. The line attenuation value may be matched with a data rate using a lookup table. The lower the line attenuation value, the better the line quality and the higher the data rate that may be used at the startup.

After receiving the probe signal 325, DTU-R 350 sends a probe signal 360 that includes about one second of energy split into 500 ms of on-time and 500 ms of off-time. DTU-C 310 also performs measurements, such as line length and line quality and determines FELM and SLM. At the end of the one-second probe signal 360, DTU-R 350 transmits a probe response 365 to DTU-C 310. The probe response is a 32-bit packet, as described above, having a probe opcode and a data field segment. The data field segment of the probe response 365 includes information regarding the measurements performed by DTU-R 350, such as the line attenuation an noise margin calculated by DTU-R 350 while DTU-C 310 was transmitting the probe signal 325.

In one embodiment, if the probe response 365 is valid, DTU-C 310 compares the line attenuation received from DTU-R 350 with the line attenuation data calculated by DTU-C 310 during the probe signal 360 and uses the worst value. The worst value is used for a conservative estimation of the line quality in order to ensure that DTU-C 310 and DTU-R 350 start at the highest error-free rate.

As stated above, in one embodiment, the probe signals may be used to perform measurements at 160 Kbps data rate. In some embodiments, the probe signals may be transmitted at additional data rates such as 784 Kbps and 2320 Kbps to obtain more line information in order to select the highest error-free rate.

Turning back to FIG. 3, once DTU-C 310 receives the probe response 365, successfully, the pre-synchronization process enters the rate negotiation phase 303. In this phase, DTU-C 310 transmits a rate message 330. The rate message 330 is a 32-bit data packet, as described above. The rate message 330 includes a rate negotiation opcode and a recommended startup rate based on the line quality measurements, device types and other information exchanged during the discovery phase 301 and the probe phase 302. As stated above, DTU-C 310 and DTU-R 350 negotiate the startup rate based on the line quality. In one embodiment, each side has a master rate/attenuation table which contains the optimum rate for a given attenuation value. In one embodiment, the master rate/attenuation table may be initialized to the rates shown in Table 1, form highest to lowest rates based on the attenuation level.

TABLE 1

Master Rate/Attenuation Table

Master Rates

| |
|---|
| 2320 Kbps |
| 1568 Kbps |
| 1552 Kbps |
| 1536 Kbps |
| 1168 Kbps |
| 1040 Kbps |
| 784 Kbps |
| 768 Kbps |
| 528 Kbps |
| 416 Kbps |
| 400 Kbps |
| 384 Kbps |
| 272 Kbps |
| 208 Kbps |
| 192 Kbps |
| 160 Kbps |
| 144 Kbps |

Furthermore, each side may also have a more tailored major rate table and device rate table that may reduce the number of allowed rates and provide custom settings by a user through API commands. The major rate table may be initialized to the rates shown in Table 2. The device rate table may also be initialized at run time to the default values in the major rate table below.

TABLE 2

Major Rate Table

Major Rates

| |
|---|
| 2320 Kbps |
| 1552 Kbps |
| 1168 Kbps |
| 784 Kbps |
| 528 Kbps |
| 416 Kbps |
| 272 Kbps |
| 144 Kbps |

DTU-C 310 obtains the best data rate from the rate attenuation table based on the line quality, selects the nearest rate from either the major rate table or the device rate table, and transmits that rate as the recommended rate to DTU-R 350. In one embodiment, DTU-C 310 uses the major rate table and allows the user to direct DTU-C 310 to use the device rate table through an API command. As described above, DTU-C 310 transmits the rate message 330 including the recommended rate. If DTU-R 350 cannot support the recommended rate for various reasons such as not finding the rate in its rate table, DTU-R 350 will select the nearest lower rate that it can support and insert that rate into a rate response 370. The rate response 370 is a 32-bit packet, as described above. The rate response 370 is then transmitted to DTU-C 310. The rate message and the rate response transactions will continue until both sides agree on a rate. In some embodiments, DTU-C 310 may transmit more than one rate to DTU-R 350 to choose from. Once DTU-C 310 receives an agreed upon rate, DTU-C 310 may transmit a 32-bit packet start up frame having a startup opcode to advise DTU-R 350 that the startup training is to begin at the agreed upon rate.

Figure 4A:
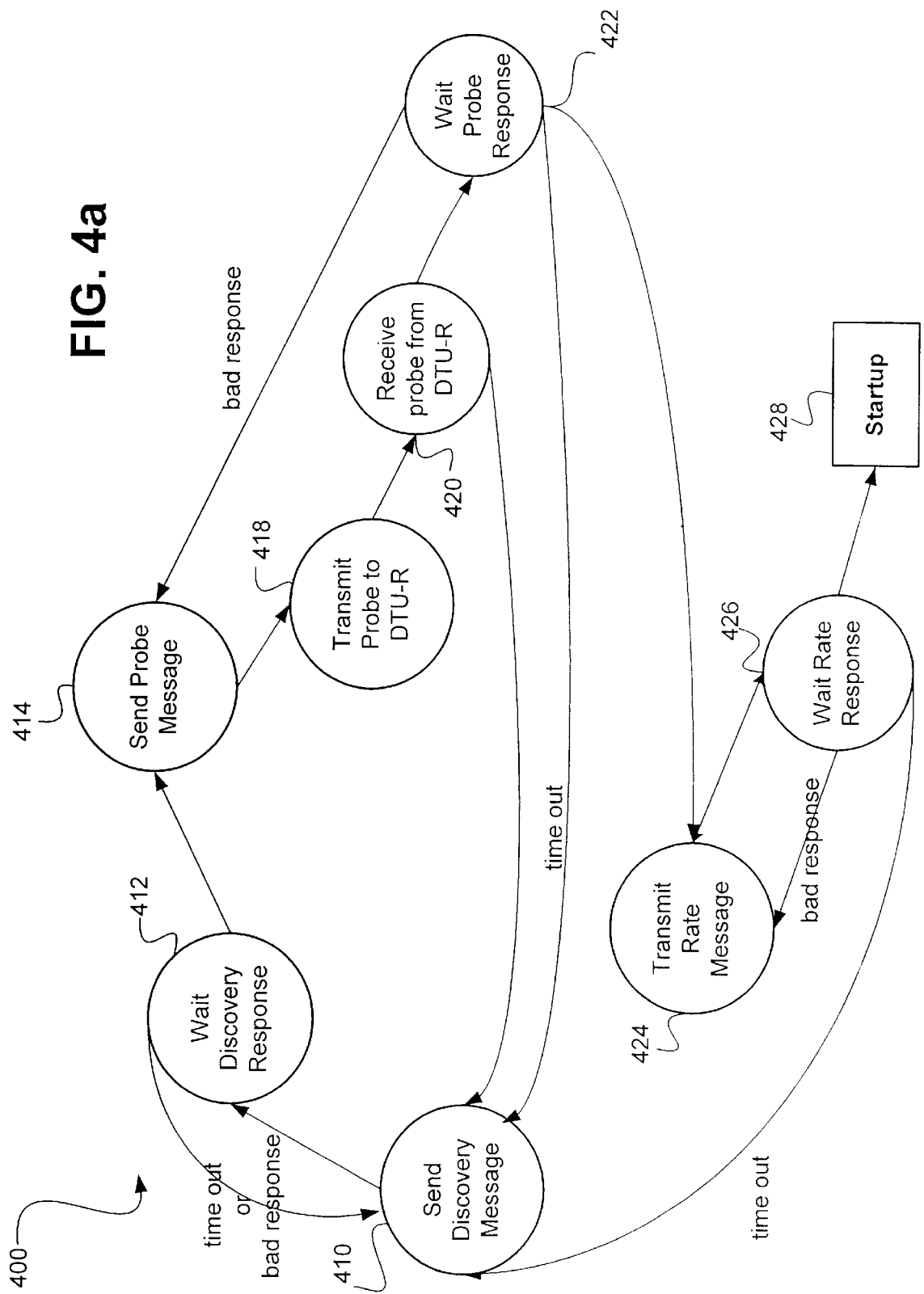
FIG. 4a illustrates an example central office state machine for implementation of the pre-synchronization protocol of FIG. 3.

Turning to FIG. 4a, an example DTU-C state machine 400 is shown. The pre-synchronization protocol of the present invention may include algorithms for error recovery, retry and timeout. As stated above, in one embodiment, DTU-C acts as the master and in accordance with the state machine 400. As shown in FIG. 4a, DTU-C starts the discovery phase in state 410 by sending a discovery message. The state machine 400 further starts a time-out timer in state 410. In one embodiment, for example, the time-out timer may be set to three (3) seconds. The time-out timer is used by the state machine 400 to recover from situations where the communication line is disconnected or where the communication line quality is so poor that communications cannot take place.

After sending the discovery message, the state machine 400 will move to a wait discovery message state 412. In state 412, the state machine 400 waits for a discovery response packet from DTU-R. If there is an error in the reception, for example, the checksum is not valid, DTU-R will return a response packet to DTU-C with a NAK opcode, rejecting the discovery message sent by DTU-C in state 410. If a NAK is received, the state machine 400 moves back to state 410, re-sends the discovery message, re-starts the time-out timer and moves to the wait discovery response state 412. This process repeats indefinitely until DTU-R receives the discovery message and sends the discovery response to DTU-C. However, if the time-out timer expires before DTU-C receives either a NAK or a discovery response, the state machine 400 moves from the wait discovery response state 412 back to the send discovery message state 410 and the process starts again.

Once the state machine 400 receives the discovery response from DTU-R, the state machine 400 moves to the first state of the probe phase or state 414. In state 414, the state machine 400 sends a probe message to DTU-R. The state machine 400 then moves to a transmit probe to DTU-R state 418 in which the state machine 400 shortly after sending the probe message starts transmitting a one-second probe to DTU-R, as described above. As stated earlier, DTU-R uses the probe signal to perform measurements relating to the line quality and the like. At the end of the one-second probe signal transmission in state 418, the state machine 400 moves to a receive probe from DTU-R state 420 and starts the time-out timer. In state 420, the state machine 400 performs measurements relating to the line quality using the one-second probe signal from DTU-R. If no probe signal is received from DTU-R, the time-out timer of the state machine 400 will eventually time out and, as a result, in one embodiment, the state machine 400 moves to the first state, i.e., the send discovery message state 410, and re-starts the pre-synchronization process again.

After receiving the probe signal from DTU-R in state 420, the state machine 400 moves to a wait probe response state 422 where the state machine 400 waits to receive a 32-bit packet, including information relating to the line quality and any other useful information from DTU-R. If the time-out timer expires before any response is received from DTU-R, the state machine 400 moves to the first state, i.e., the send discovery message state 410, and re-starts the pre-synchronization process again. If the state machine 400 receives a NAK from DTU-R in state 422, the state machine 400 moves to the beginning of the probe phase (or send probe message state 414) and re-starts the probe phase. In some embodiments, a threshold level may be used, such that if the number of NAKs received in the wait probe response state 422 exceeds the threshold level, the state machine 400 would move to the first state of the pre-synchronization process (or the send discovery message state 410) instead of moving to the send probe message state 414. In one embodiment, the threshold level may be set to three (3), such that after returning to the send probe message state 414 three times as a result of receiving a NAK in the wait probe response state 422, the state machine 400 moves to the send discovery message state 410 when a fourth NAK is received in the wait probe response state 422.

Once the state machine 400 receives the probe response from DTU-R successfully, the state machine 400 moves from state 422 to the first state of the rate negotiation phase or the transmit rate message state 424. In state 424, the state machine 400 transmits a 32-bit rate packet, including a rate opcode and a recommended rate to DTU-R. As explained above, the recommended rate may be selected based on the information gathered by DTU-C and the information received from DTU-R during previous states of the state machine 400. The information may include the line quality data, device type and the like. In the transmit rate message state 424, the state machine 400 further starts a time-out timer, for recovery purposes, about the time the rate message is transmitted to DTU-R. At this stage, the state machine 400 moves from state 424 to the wait rate response state 426. If the time-out timer expires while the state machine 400 is waiting in state 426, the state machine 400 reverts back to the first state 410 and re-starts the pre-synchronization process.

If the state machine 400 receives a NAK from DTU-R, the state machine 400 moves back to the transmit rate message state 424, re-transmits the rate message, re-starts the time-out timer and moves to the wait rate response state 426. In some embodiments, if the number of NAKs received from DTU-R in state 426 exceeds a threshold level, such as three times, the state machine 400 does not move back to state 424, but instead, the state machine 400 assumes that DTU-R has started up the training at the last rate and begins to train at that rate. In other embodiments, however, if the number of NAKs received from DTU-R in state 426 exceeds a threshold level, such as three times, the state machine 400 moves to the send discovery message state 410 and re-starts the pre-synchronization process.

As discussed above, the rate negotiation phase is a reiterative process and several rates may be exchanged between DTU-C and DTU-R before both sides agree on a rate to start training at. Once the state machine 400 receives an agreeable rate from DTU-R, the state machine 400 sends a startup message to DTU-R and moves to the startup state 428 where DTU-C and DTU-R synchronize at the agreed upon rate.

Figure 4B:
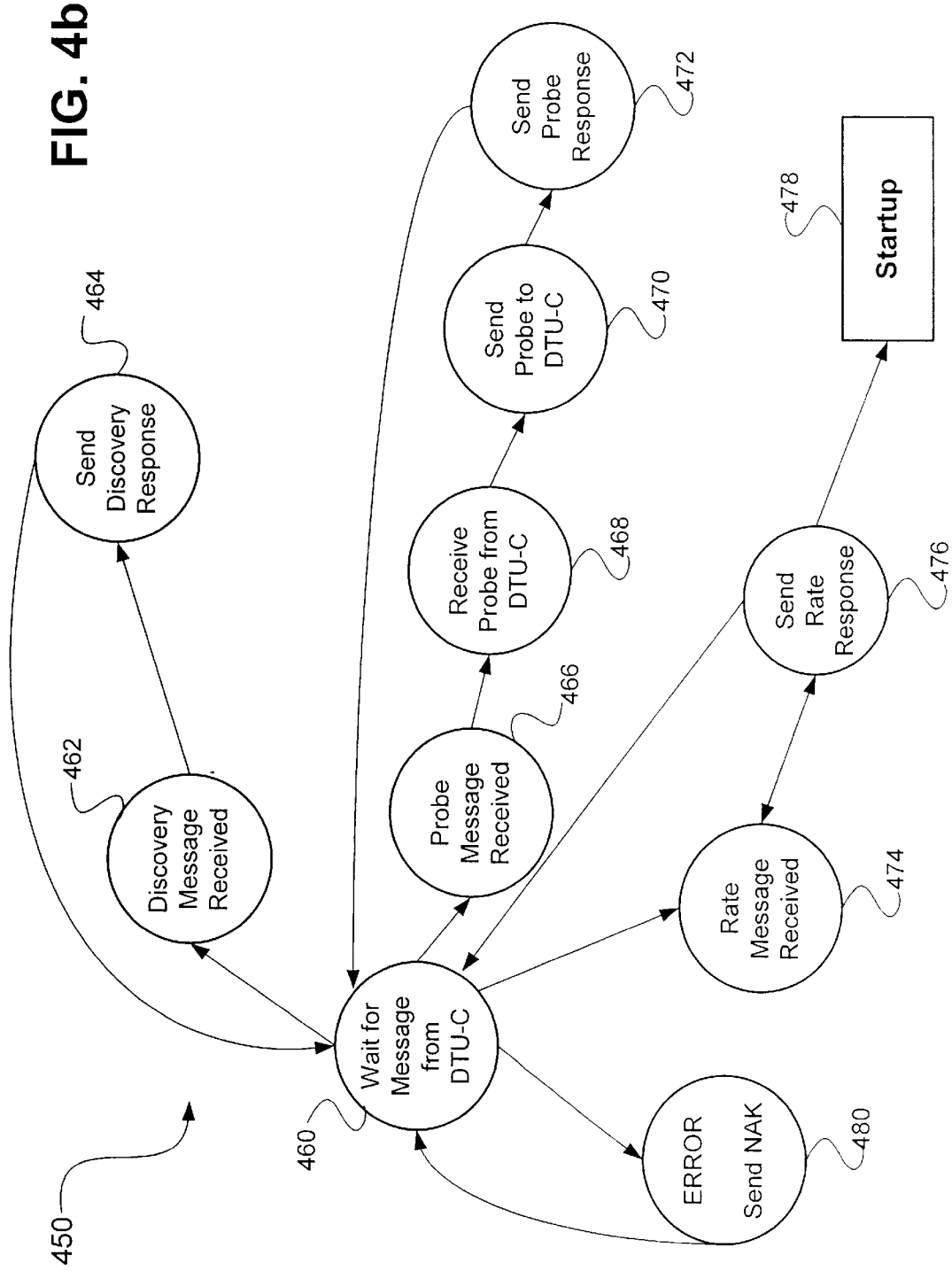
FIG. 4b illustrates an example remote terminal state machine for implementation of the pre-synchronization protocol of FIG. 3.

Turning to FIG. 4b, an example DTU-R state machine 450 is illustrated. As shown, in one embodiment, the DTU-R state machine 450 acts as a slave to the DTU-C state machine 400. The starting state for the state machine 450 is a wait for message from DTU-C state 460. In this state, the state machine 450 waits for three possible messages from DTU-C: a discovery message, a probe message or a rate message; where each message is represented by a distinct state, a discovery message received state 462, a probe message received state 466 or a rate message received state 474, respectively. Initially, the state machine 450 waits for a discovery message from DTU-C. If the received message does not contain a proper opcode or the checksum is invalid, the state machine 450 moves from the state 460 to an error state 480, transmits a NAK packet to DTU-C and moves back to the state 460 to receive another message from DTU-C. If the received message includes a discovery opcode and checksum is valid, the state machine 450 moves to the discovery message received state 462 and decodes the data field segment of the message to retrieve the identification information, device type and the like transmitted by DTU-C. After decoding the message in the state 462, the state machine 450 moves to a send discovery response state 464 where the state machine 450 transmits a 32-bit packet, including a discovery opcode, identification information relating to DTU-R and a checksum, to DTU-C. Next, the state machine 450 returns to the wait message state 460 to receive another message from DTU-C.

At this point, the state machine 450 waits for a probe message from DTU-C. If the received message does not contain a proper opcode or the checksum is invalid, the state machine 450 moves from the state 460 to an error state 480, transmits a NAK packet to DTU-C and moves back to the state 460 to receive another message from DTU-C. If the received message includes a probe opcode and checksum is valid, the state machine 450 moves to the probe message received state 466 and decodes the data field segment of the message. After decoding the message in the state 466, the state machine 450 moves to a receive probe from DTU-C state 468 where DTU-R receives a probe signal from DTU-C and the state machine 450 performs measurements in the state 468 to gather information relating to the line quality. After performing measurements about one second, the state machine 450 moves from the state 468 to a send probe to DTU-C state 470 where a probe signal is transmitted to DTU-C, so DTU-C may perform similar measurements with respect to the communication line conditions. After transmitting about one second of probe signal in the state 470, the state machine 450 moves to a send probe message state 472 where a 32-bit packet of probe response is transmitted to DTU-C. The probe message includes a probe opcode, information relating to measurements performed by DTU-R in the state 468 and a checksum. Once the probe response is transmitted, the state machine 450 returns to the wait message state 460 to receive another message from DTU-C.

Next, the state machine 450 waits for a rate message from DTU-C. If the received message does not contain a proper opcode or the checksum is invalid, the state machine 450 moves from the state 460 to an error state 480, transmits a NAK packet to DTU-C and moves back to the state 460 to receive another message from DTU-C. If the received message includes a rate opcode and checksum is valid, the state machine 450 moves to the rate message received state 474 and decodes the data field segment of the message to determine DTU-C recommended rate for startup training. After decoding the message in the state 466, the state machine 450 moves to a send rate response state 476 where DTU-R determines whether the DTU-C recommended rate finds a match in the above-described DTU-R rate tables. If so, a 32-bit packet rate response message, including a rate opcode, the recommended rate and a checksum, is transmitted to DTU-C. In one embodiment, at this stage, the state machine 450 moves to a startup state 478 and DTU-R starts training at the recommended rate. In another embodiment, the state machine 450 may return to the state 460 and await a message from DTU-C, including a startup opcode, before moving to the startup state 478.

On the other hand, if the recommended rate does not find a match in DTU-R rate tables, in one embodiment, a 32-bit packet rate response message, including a rate opcode, a lower nearest rate to the recommended rate and a checksum, is transmitted to DTU-C. After transmitting the rate response, the state machine 450 returns to the wait message state 460 and waits for the next message from DTU-C. If DTU-R recommended rate is acceptable to DTU-C, in one embodiment, the state machine 450 may receive a startup message. In that event, the state machine 450 moves to the startup state 478 and starts training at the DTU-R recommended rate. If, however, the DTU-R recommended rate is not acceptable to DTU-C, in one embodiment, DTU-C may transmit a 32-bit packet rate response message, including a rate opcode, a lower nearest rate to the DTU-R recommended rate and checksum. As a result, the state machine 450 moves to the send rate response state 476 and this reiterative rate negotiation process continues until both sides settle on a rate and start training at that rate.

As a result of the pre-synchronization process of the present invention, DTU-C and DTU-R may start training at higher rate. As stated above, the higher the data rate, the faster the training time. Accordingly, the connection time is substantially lessened using the above-described pre-synchronization process. After completing the startup process and training at the negotiated rate, in one embodiment, DTU-C and DTU-R move to a post-synchronization phase to achieve the optimal rate. Various aspects of the post-synchronization phase will be described below in reference to FIGS. 5–9.

In one embodiment, DTU-C and DTU-R may support any data rate in 8 Kbps increments. In other embodiments, however, a predetermined set of data rates, such as 144 Kbps, 272 Kbps, 400 Kbps, 528 Kbps, 784 Kbps, 1168 Kbps, 1552 Kbps and 2320 Kbps may be supported. The supported data rates may be stored in a memory as a fixed length array. These supported data rates can be calculated based on the following formula: Data Rate=N*64 Kbps+16 Kbps, where N=2 to 36.

As discussed above in conjunction with the pre-synchronization phase, in one embodiment, DTU-C and DTU-R train at a conservative rate to ensure that synchronization is achieved free of errors. As a result, in the post-synchronization phase, the line quality may be such that DTU-C and DTU-R can train at a higher rate. Furthermore, after the synchronization, the line quality may be measured based on SLM, FELM and CRC/FEBE ("Far-End Block Error") or bit-error-rate. In general, the line quality is used to determine if DTU-C and DTU-R can attempt a faster data rate, drop down to a slower data rate, or stay at the current data rate.

The additional CRC/FEBE check provides a more accurate estimation of the line quality. The CRC/FEBE check is used to accumulate an average number of errors. The CRC/FEBE check may not provide sufficient information to determine if the data rate can be increased; however, the CRC/FEBE check may indicate whether the data rate is too high.

The post-synchronization phase may also utilize the SLM and FELM checks used during the pre-synchronization phase to better determine the line quality. In one embodiment, SNR is generated from a look-up table based on various noise models available in the art.

Figures 1, 5:
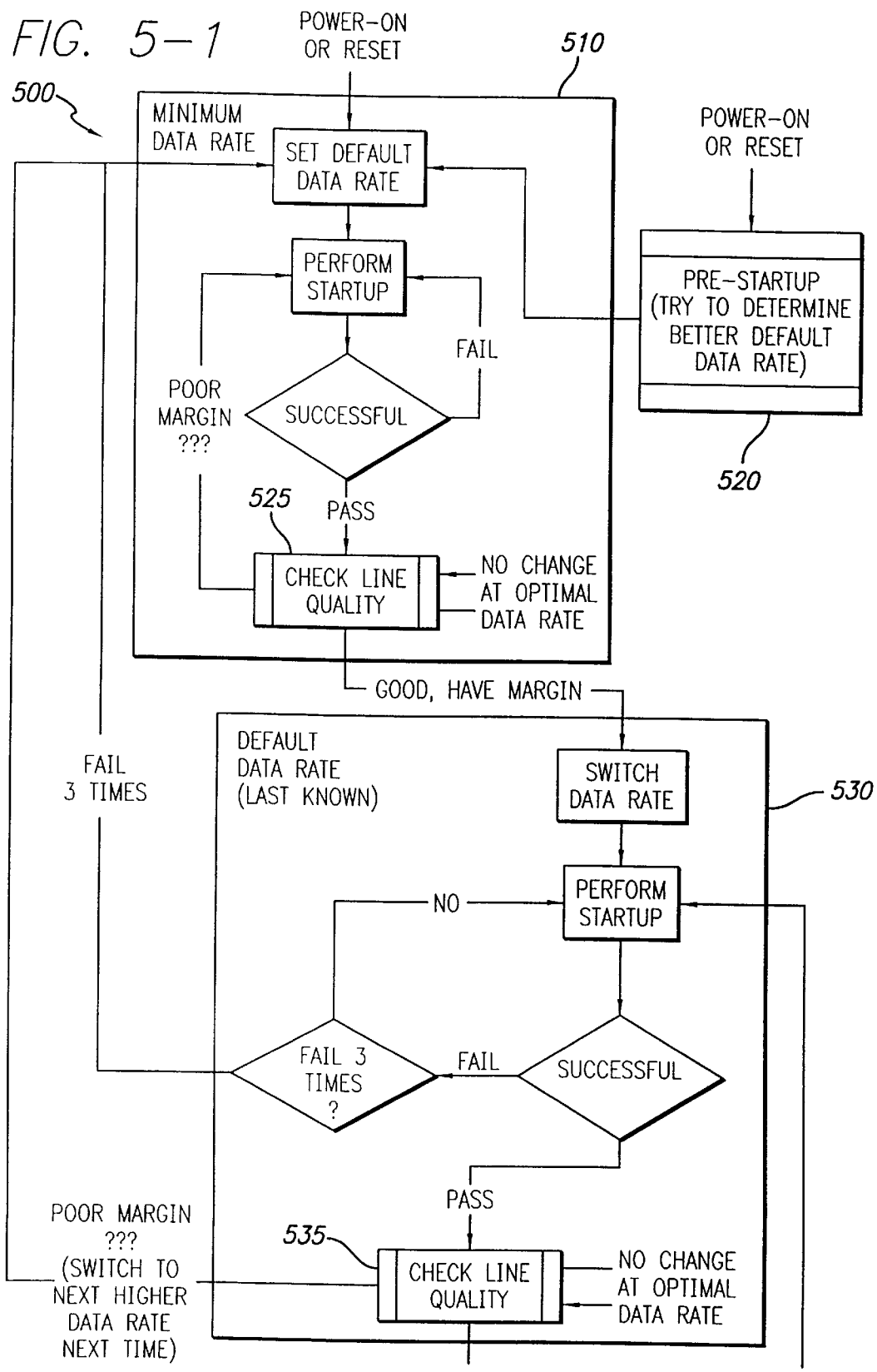
FIG. 5 illustrates an example post-synchronization process according to one embodiment of the present invention.
Figures 2, 5:
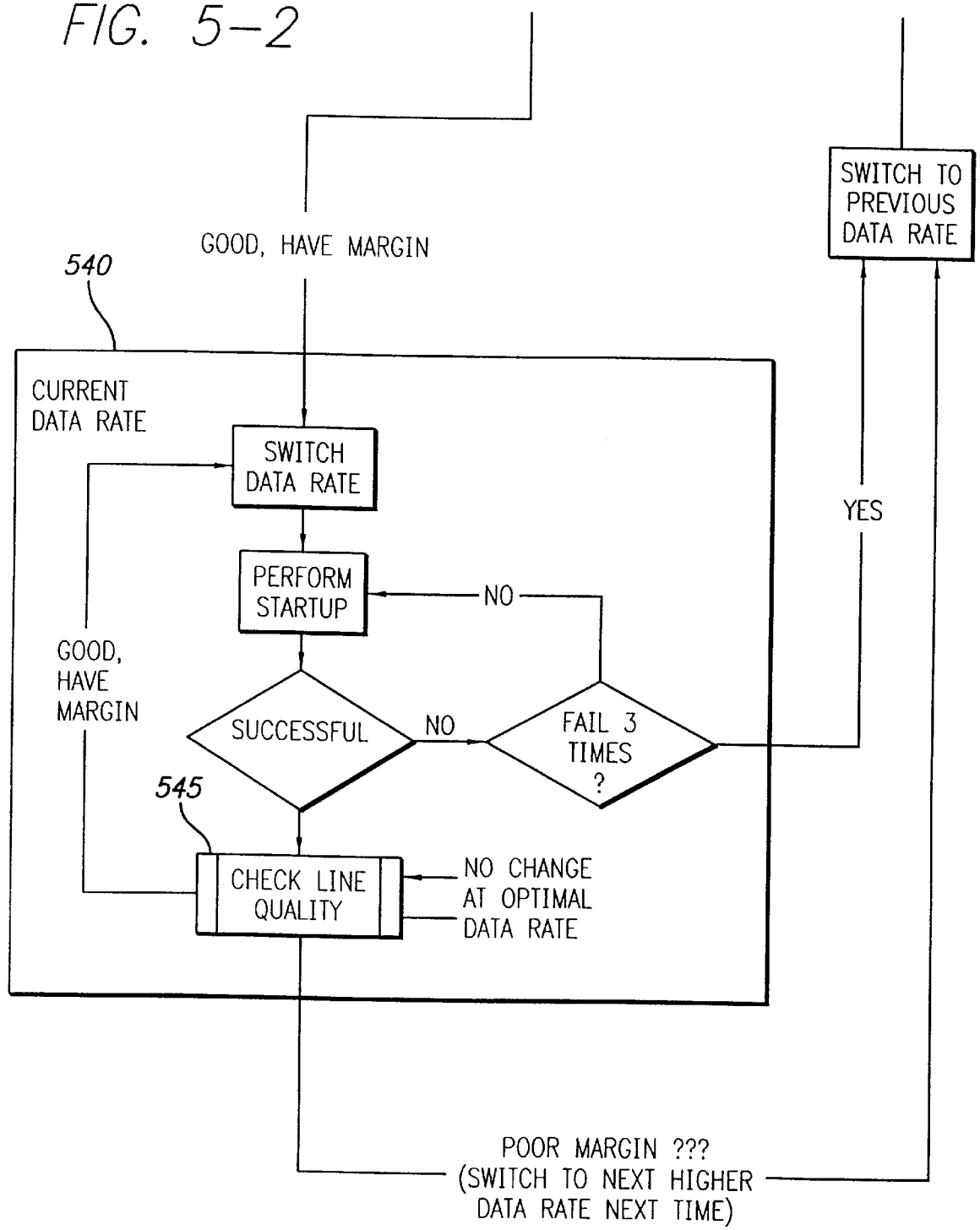

FIG. 5 illustrates the post-synchronization process 500 according to one embodiment of the present invention. As discussed above, DTU-C and DTU-R startup at the pre-synchronization negotiated data rate, see states 510 and 520. DTU-C and DTU-R may then train at a higher data rate based on CRC/FEBE, SLM and FELM checks on the line quality, see steps 525, 535 and 545. If the initial negotiated data rate is low, it is possible that the line quality measurements are inaccurate for determining the highest possible data rate. Therefore, DTU-C and DTU-R may have to perform several jumps or connect at various intermediate rates during the post-synchronization phase in order to achieve the optimal data rate, as shown in states 530 and 545.

One purpose of the post-synchronization phase is to achieve the optimal data rate in the fastest time; however, at the same time, the post-synchronization process provides a quick recovery time in the event of failures. To that end, DTU-C and DTU-R should maintain a list of all of supported data rates. In addition, four data rates may be stored in a history list: (1) Minimum Data Rate 510—The data rate to fall back to in the event of unexpected errors, (2) Default Data Rate 530—The last known data rate that DTU-C and DTU-R trained to, (3) Previous Data Rate (not shown)—A temporary data rate as DTU-C and DTU-R try to connected at new data rates, and (4) Current Data Rate 540—The current data rate.

The DTU-C will always initiate a change in data rate when switching to a higher speed. In the event of a failure, the DTU-C and DTU-R will automatically fall back to the previous (or default) data rate to regain synchronization of DTU-C and DTU-R.

Figures 1, 6:
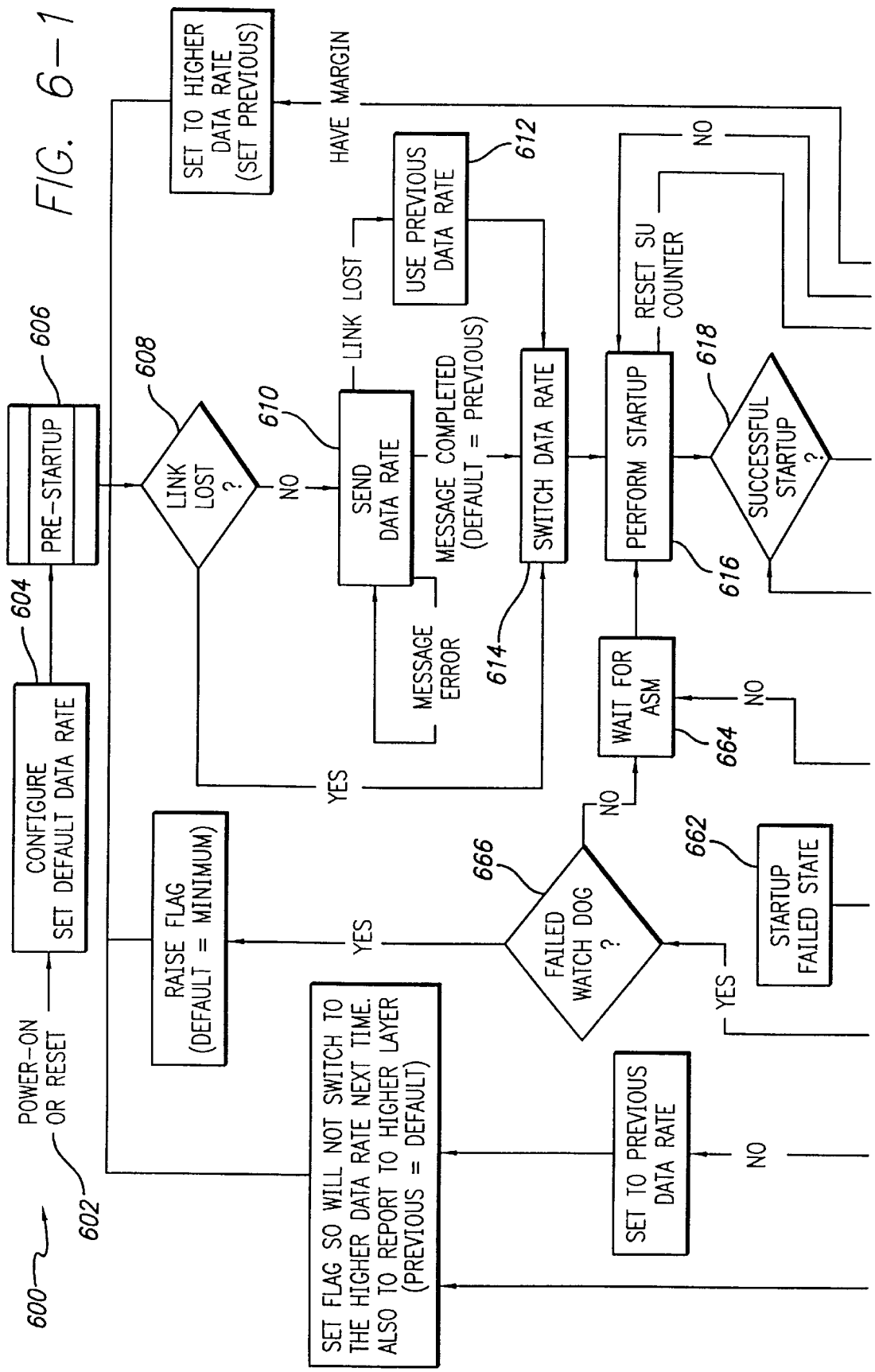
FIG. 6 illustrates a flow diagram of an example implementation of some aspects of the present invention by a central office.
Figures 2, 6:
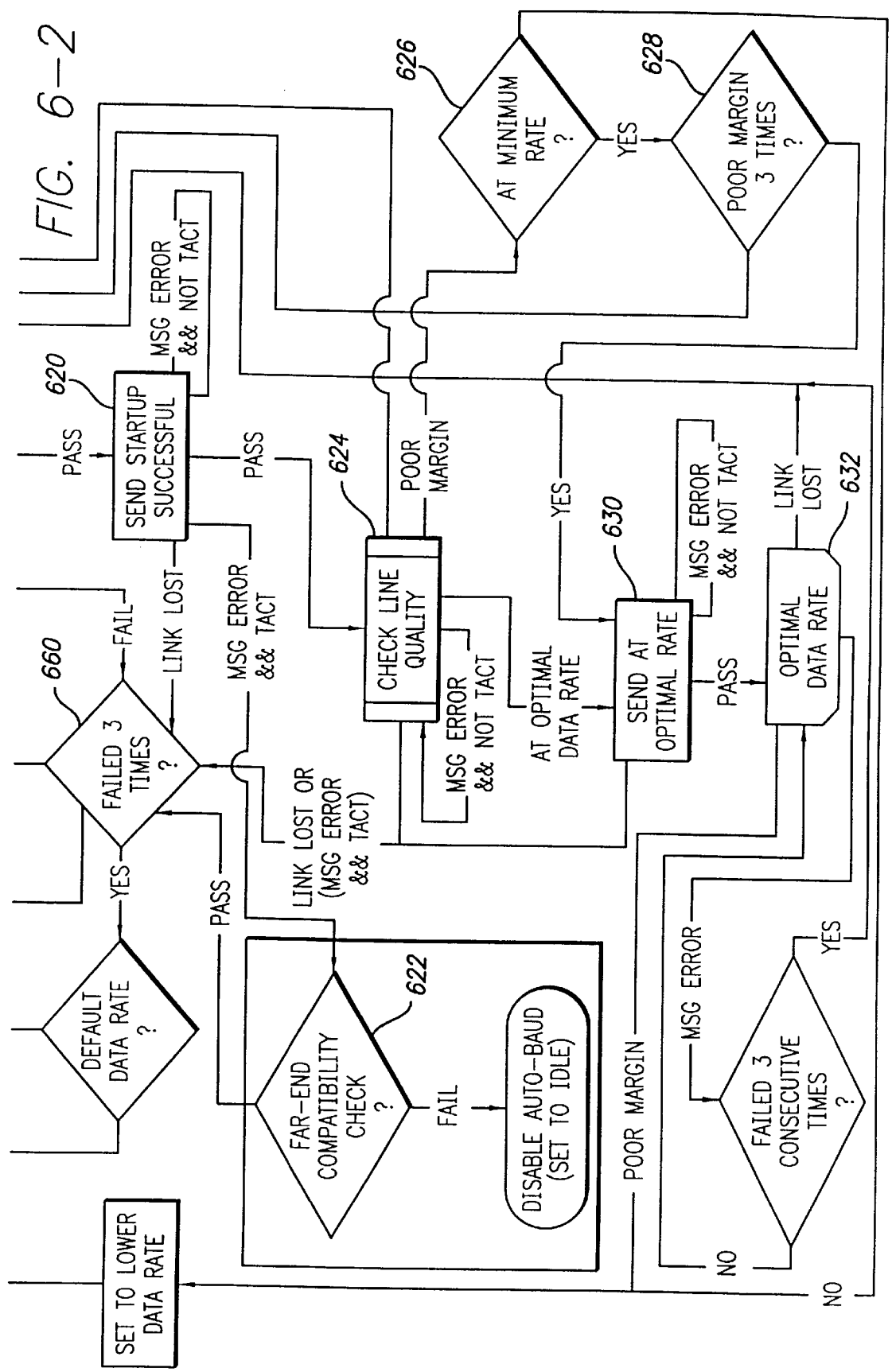

FIG. 6 illustrates a detailed a flow diagram 600 of an example implementation of some aspects of the present invention by the CO. As shown, after the power-on reset 602 and in state 604, DTU-C is configured and data rate is set to a default value, such as 144 Kbps. While in the pre-synchronization or pre-startup state 606, post-synchronization state machine remains idle until pre-synchronization has been completed. At which point, the current rate or the negotiated rate between DTU-C and DTUR is loaded. Next, the flow diagram 600 moves to a link lost state 608 to determine whether the communication link between DTU-C and DTU-R is up or down. If the communication link is not lost, the flow diagram 600 proceeds to send data rate state 610.

In the send data rate state 610, the communication channel is open between DTU-C and DTU-R and a message containing the next data rate is transmitted to DTU-R. However, this message may not be transmitted if the next data rate is the default rate. Once sending of the message is complete, the default rate should be set to the previous data rate or, if the first time, to the current data rate, since there is no need for DTU-C to revert back to the minimum data rate if the line condition is good at the previous data rate.

If a message error is detected, the message is continuously transmitted, until it is determined that the link is lost. At this stage, the flow diagram 600 proceeds to state 612. At state 612, DTU-C loads the previous data rate based on the assumption that DTU-R has failed to receive the message and has also reverted to the previous data rate. The state 612 is designed to handle an unlikely event of the communication link going down after it has been determined in the state 608 that the link was up.

As shown in FIG. 6, the flow diagram 600 proceeds to switch data rate state 614 after leaving either state 610 or 612. At state 614, the number of startup attempts are initialized to zero and the flow diagram 600 proceeds to perform the startup process in state 616. At state 618, the synchronization process is monitored to determine a successful completion or failure of the startup attempts. If the startup process is successful, the flow diagram 600 proceeds to state 620 to send a startup successful message to DTU-R. In turn, DTU-C awaits a startup successful message from DTU-R. By successfully sending and receiving the startup message, DTU-C and DTU-R communicate that they have reached a normal operation state. The successful start up message is intended as a safeguard in the event that one end has successfully trained while the other end has failed during the training process. Furthermore, the successful startup message may communicate other messages, such as the software version which may be used to determine computability between the two ends. As shown, if the link is lost in state 620, the flow diagram treats this event as a startup failure and proceeds to failure state 660 discussed below.

If a message error is detected in state 620, the successful startup message is re-sent until an activation interval time-out is detected. If the activation interval time-out is detected, the flow diagram 600 proceeds to a far-end compatibility check state 622. At this point, it is determined whether the message error is due to DTU-R's failure to train or whether DTU-R does not support various aspects of the present invention. If the far-end compatibility state 622 determines that DTU-R is incompatible, the auto baud or automatic data rate selection process of the present invention is disabled.

On the other hand, if a successful startup message is received from DTU-R in state 620, the flow diagram 600 moves to check line quality state 624. In the check line quality state 624, the line quality at the new startup data rate is determined. The check line quality state 624 uses the message channel to query DTU-R's status. In one embodiment, the check line quality state 624 may classify the communication link to have one of the following conditions: good margin, poor margin, optimal data rate or link lost.

If the communication line is determined to have a good margin, the data rate may be increased based on DTU-C and DTU-R line quality parameters. On the other hand, if there is a poor margin, the flow diagram moves to state 626 and the data rate may be reduced based on DTU-C and DTU-R line quality parameters. In one embodiment, DTU-C may be prevented from training at the data rate with a poor margin again. If it is determined in state 626 that the current data rate is already at the minimum data rate, the flow diagram moves to the startup state 616 to ensure that the poor margin was not due to a single poor training. Before moving to the startup state 616, however, in state 628, the flow diagram 600 determines whether three attempts to startup have already been made, if so, the flow diagram 600 reports the poor margin while at the minimum data rate. As a result, it may be assumed that the minimum data rate is the best data rate that can be performed on the given communication line and the flow diagram 600 proceeds to send at optimal rate state 630.

Generally, if it is determined that the communication line is at the optimal rate, based on DTU-C and DTU-R line quality parameters, the flow diagram 600 proceeds to send at optimal rate state 630. On the other hand, if a link lost is detected, it is treated as a startup failure and the flow diagram 600 proceeds to the failure state 660. In one embodiment, the flow diagram 600 may also check to see if a message error and an activation time-out are detected, if so, the flow diagram 600 moves to the failure state 660. At this stage, it may not be necessary to proceed to the far-end compatibility check state 622, since the flow diagram 600 has already successfully passed the send successful startup message state 620.

Assuming that the flow diagram 600 reaches the send at optimal rate state 630, DTU-C sends an optimal rate message to DTU-R in order to communicate that the optimal data rate has been reached. Similar to the conditions discussed above, if a link lost is detected at state 630, the flow diagram 600 proceeds to the failure state 660 and if a message error is detected, the message is re-sent until the activation interval time-out is also detected and if a message error and the activation time-out are both detected, the flow diagram 600 proceeds to the failure state 660. On the other hand, if DTU-C detects a successful message, the flow diagram 600 proceeds to optimal data rate state 632.

The optimal data rate state 632 may be considered the normal operation state of the flow diagram 600. At this state, if the communication link is lost, the flow diagram 600 may assume that such loss was due to a physical break on the line and thus may re-try startup at the current data rate by proceeding to the startup state 616. During the startup re-try, the flow diagram 600 may select a higher data rate if the conditions warrant an increase in the data rate. In one embodiment, the optimal data rate state may 632 check for poor margin in addition to checking for the loss of the communication link. If poor margin is detected, then a lower data rate may be selected. Further, if three consecutive message errors occur in the optimal data rate state 632, the flow diagram 600 may assume that the communication link is down and as a result proceed to the startup state 616 to perform startup at the current data rate.

Now, turning to the failure state 660, the flow diagram 600 proceeds to this state for reasons such as failure of training, detection of a link loss during messages or detection of a time-out while sending messages. In one embodiment, these error conditions may be treated similarly to simplify the flow diagram 600. As shown, the failure state 660 increments a startup attempt counter to determine whether the failure condition, at the current data rate, has occurred three consecutive times. If this condition has not been met, the flow diagram 600 proceeds to wait for the activation state manager ("ASM"), in state 664, to reach an inactive state before checking for any more status. However, if there has been three consecutive failures, the current data rate is set to the previous data rate and a startup at a lower data rate is initiated at link lost state 608. Yet, if the current rate is at the default data rate, the flow diagram 600 may determine in watchdog state 666, how many times the default rate may be attempted in the startup state 616. If the watchdog state determines that the number of tries have reached a predetermined number, e.g. ten (10), the data rate may be set to the minimum data rate. In one embodiment, the flow diagram 600 may retain the history, so that when the DTU-C recovers from an error condition, it may recall the successful startup data rates.

Figure 7:
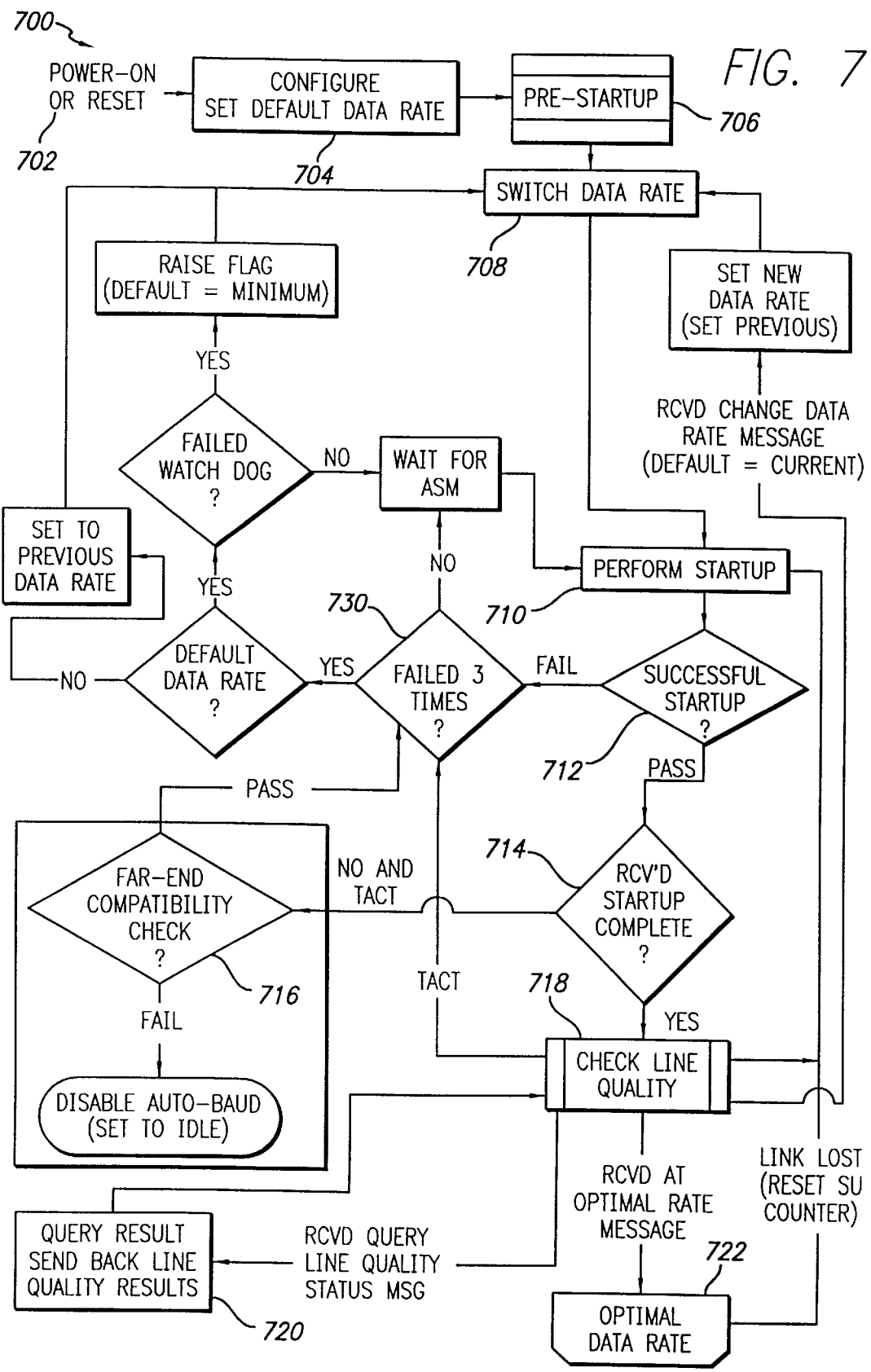
FIG. 7 illustrates a flow diagram of an example implementation of some aspects of the present invention by a remote terminal.

FIG. 7 illustrates a detailed a flow diagram 700 of an example implementation of some aspects of the present invention by a remote terminal. In one embodiment, DTU-R implementation is less complex than that of DTU-C (as discussed in conjunction with FIG. 6), since DTU-R reacts to incoming messages generated by DTU-C. Similar to the DTU-C implementation, after the power-on reset 702 and in state 704, DTU-R is configured and data rate is set to a default value, such as 144 Kbps. While in the pre-synchronization or pre-startup state 706, post-synchronization state machine remains idle until pre-synchronization has been completed. At which point, the current rate or the negotiated rate between DTU-C and DTUR is loaded. Next, the flow diagram 700 proceeds to switch data rate state 708 where the number of startup attempts are initialized to zero and the flow diagram 700 proceeds to perform the startup process in state 710. At state 712, the A synchronization process is monitored to determine a successful completion or failure of the startup attempts. If the startup process is successful, the flow diagram 700 proceeds to state 714 to receive a startup successful message from DTU-C. In turn, DTU-R also transmits a startup successful message to DTU-C.

On the other hand, if the startup attempt in state 712 fails, the flow diagram 700 moves to failure state 730 to determine whether the failure has occurred three consecutive times, in which case DTU-R may revert back to the previous (or default) data rate to try and regain loop synchronization.

Assuming the startup process is successful, as explained in conjunction with FIG. 6, DTU-R should receive the successful startup message in state 714 to confirm that the startup has been successful. Receipt of the successful startup message is important since it is possible that, due to noise or various loop conditions, one side successfully completes the startup process while the other side fails to do so. If the successful startup message is not received before the activation-timer times out, the flow diagram 700 may proceed to far-end compatibility check state 716 to determine whether DTU-C supports various aspects of the present invention.

Assuming that the successful startup message is successfully exchanged between DTU-C and DTU-R, the flow diagram 700 proceeds to check line quality state 718 where DTU-R waits for incoming messages from DTU-C and reacts accordingly. At this stage, DTU-R may receive various messages from DTU-C, such as one of the following messages: request line quality results (NMR, FELM or CRC), change data rate (higher or lower) or at optimal data rate.

If a message requesting line quality results is received, the flow diagram 700 proceeds to state 720 where DTU-R will make the appropriate measurements and return the results to DTU-C. If DTU-R receives a change data rate message, the default data rate is set to the current data rate that is known to be an acceptable data rate. In general, there is no need to revert back to the minimum data rate in the event of a serious physical error since the communication link may be set to an acceptable rate.

If DTU-R receives an optimal data rate message, the flow diagram 700 proceeds to optimal data rate state 722. However, if the activation-timer times out before an optimal data rate message is received, the flow diagram 700 assumes that DTU-C could not train properly and, as a result, the flow diagram 700 proceeds to the failre state 730. If the communication link is lost in the optimal data rate state 722, the flow diagram 700 proceeds to the startup state 710 where DTU-R performs the startup proceess at the current data rate. During this startup re-try, a higher data rate may be selected if the line conditions warrant an increase. As a result of the post-synchronization process of the present invention, the time to achieve a connection at an optimal data rate is substantially reduced.

When implemented in software, at least some elements of the present invention can be in the form of computer data, including, but not limited to, any bits of information, code, etc. The data may be arranged in group of bits or data segments and may be stored in a processor readable medium or transmitted by a data signal embodied in a carrier wave over a transmission medium or communication link. For example, bits of information in a discovery message may form various data segments that can be transmitted by a data signal embodied in a carrier wave. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection a coaxial connection, a fiber optic connection, satellite connections (e.g. Digital Satellite Services, etc.), wireless connections, radio frequency (RF) links, electromagnetic links, two way paging connections, etc., and combinations thereof. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Internet, etc.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A method of switching a first data rate to a second data rate in a communication system including a first DSL device and a second DSL device, said method comprising the steps of:

transmitting a discovery message by said first DSL device to said second DSL device;

receiving a discovery response message from said second DSL device in response to said transmitting said discovery message;

transmitting a probe message to said second DSL device in response to said receiving said discovery response message;

transmitting a first probe signal to said second DSL device following said transmitting said probe message;

receiving a second probe signal from said second DSL device in response to said transmitting said first probe signal;

receiving a probe response message from said second DSL device in response to said transmitting said first probe signal;

negotiating said first data rate based on said probe response message;

synchronizing with said second DSL device at said first data rate;

measuring a line quality at said first data rate;

determining said second data rate based on said line quality;

transmitting a rate change request by said first DSL device to said second DSL device, said rate change request including said second data rate; and re-synchronizing with said second DSL device at said second data rate;

wherein each said message includes an opcode segment, a data field segment and a checksum segment, and wherein each said segment includes a plurality of data bits represented by an energy on-time or off-time.

2. The method of claim 1, wherein said negotiating step includes the steps of:

transmitting a first rate message; and receiving a second rate message, including said first data rate.

3. The method of claim 1, wherein said negotiating step includes the steps of:

transmitting a first rate message;

receiving a second rate message;

determining said first data rate; and transmitting a third rate message, including said first data rate.

4. The method of claim 1 further comprising the step of gauging a line quality during the step of receiving said second probe signal.

5. The method of claim 4, wherein said step of gauging said line quality includes measuring an attenuation and a noise margin.

6. The method of claim 1, wherein said first probe signal is at one or more data rates.

7. The method of claim 6, wherein said second DSL device performs line quality measurements at said one or more data rates based on said first probe signal.

8. The method of claim 1, wherein said measuring step measures said line quality based on an attenuation, a noise margin and a bit-error-rate.

9. The method of claim 1, wherein said steps of measuring, determining, transmitting said second data rate and re-synchronizing are repeated until an optimal data rate is reached.

10. The method of claim 1, wherein said steps of measuring and determining are performed continuously, until said second data rate is determined to be different than said first data rate, before performing said step of transmitting said second data rate.

11. The method of claim 1, wherein said step of receiving said probe response message occurs before said step of receiving said second probe signal.

12. The method of claim 1, wherein said discovery message includes a device type.

13. The method of claim 1, wherein said discovery message includes a payload type.

14. The method of claim 1 further comprising the step of receiving a remote line quality measured by said second DSL device, wherein said step of determining said second data rate uses said line quality and said remote line quality to determine said second data rate.

15. The method of claim 14 further comprising the step of requesting said remote line quality from said second DSL device, prior to said receiving said remote line quality.

16. The method of claim 1, wherein said energy on-time for a first predetermined period of time indicates a "1" data bit and said energy off-time for a second predetermined period of time indicates a "0" data bit.

17. The method of claim 16, wherein said energy on-time includes scrambled two level ones.

18. The method of claim 16, wherein said energy on-time for about 50 ms indicates a "1" data bit and said energy off-time for about 50 ms indicates a "0" data bit.

19. A method of switching a first data rate to a second data rate in a communication system including a first DSL device and a second DSL device, said method comprising the steps of:

transmitting a probe message by said first DSL device to said second DSL device;

transmitting a first probe signal to said second DSL device following said transmitting said probe message;

receiving a probe response message from said second DSL device in response to said transmitting said first probe signal;

determining said first data rate after said receiving said probe response message;

synchronizing with said second DSL device at said first data rate;

measuring a line quality at said first data rate;

determining said second data rate based on said line quality;

transmitting a rate change request by said first DSL device to said second DSL device, said rate change request including said second data rate; and re-synchronizing with said second DSL device at said second data rate;

wherein each said message includes an opcode segment, a data field segment and a checksum segment, and wherein each said segment includes a plurality of data bits represented by an energy on-time or off-time.

20. The method of claim 19, further comprising the step of transmitting a second probe signal after the step of transmitting said first probe signal, wherein said first probe signal is at said first data rate and said second probe signal is at a third data rate.

21. The method of claim 19, wherein said measuring step measures said line quality based on an attenuation, a noise margin and a bit-error-rate.

22. The method of claim 19, wherein said second DSL device measures an attenuation based on said first probe signal.

23. The method of claim 19, wherein said second DSL device measures a noise margin based on said first probe signal.

24. The method of claim 19 further comprising the step of receiving a remote line quality measured by a second DSL device, wherein said step of determining said second data rate uses said line quality and said remote line quality to determine said second data rate.

25. The method of claim 24 further comprising the step of requesting said remote line quality from said second DSL device, prior to said receiving said remote line quality.

26. The method of claim 19, wherein said energy on-time for a first predetermined period of time indicates a "1" data bit and said energy off-time for a second predetermined period of time indicates a "0" data bit.

27. The method of claim 26, wherein said energy on-time includes scrambled two level ones.

28. The method of claim 26, wherein said energy on-time for about 50 ms indicates a "1" data bit and said energy off-time for about 50 ms indicates a "0" data bit.

29. A communication device comprising:
   a transmitter;
   a receiver; and
   a line quality module;
   wherein said transmitter transmits a probe message, said receiver receives a probe signal, said line quality module measures a first line quality based on said probe signal, said transmitter transmits a rate message including a first data rate, said communication device synchronizes with a remote device at said first data rate, said transmitter transmits a data rate change request, including a second data rate, and wherein said communication device re-synchronizes with said remote device at said second data rate, and wherein each said message includes an opcode segment, a data field segment and a checksum segment, and wherein each said segment includes a plurality of data bits represented by an energy on-time or off-time.

30. The communication device of claim 29, wherein said first line quality module measures an attenuation and a noise margin.

31. The communication device of claim 29, wherein said line quality module measures a second line quality at said first data rate and determines said second data rate based on said second line quality.

32. The communication device of claim 31, wherein said second line quality is based on an attenuation, a noise margin and a bit-error-rate.

33. The communication device of claim 29, wherein said receiver receives a remote line quality measured by said remote device, before said transmitter transmits said data rate change request, and wherein said second data rate is based on said line quality and said remote line quality.

34. The communication device of claim 33, wherein said transmitter requests said remote line quality from said remote device, before said receiver receives said remote line quality.

35. The device of claim 29, wherein said energy on-time for a first predetermined period of time indicates a "1" data bit and said energy off-time for a second predetermined period of time indicates a "0" data bit.

36. The device of claim 35, wherein said energy on-time includes scrambled two level ones.

37. The device of claim 35, wherein said energy on-time for about 50 ms indicates a "1" data bit and said energy off-time for about 50 ms indicates a "0" data bit.

38. A method of switching a first data rate to a second data rate in a communication system including a first DSL device and a second DSL device, said method comprising the steps of:
   receiving a discovery message by said first DSL device from said second DSL device;
   transmitting a discovery response message to said second DSL device in response to said receiving said discovery message;
   receiving a probe message from said second DSL device in response to said transmitting said discovery response message;
   receiving a first probe signal from said second DSL device following said receiving said probe message;
   transmitting a second probe signal to said second DSL device in response to said receiving said first probe signal;
   transmitting a probe response message to said second DSL device in response to said receiving said first probe signal;
   negotiating said first data rate based on said probe response message;
   synchronizing with said second DSL device at said first data rate determined by said second DSL device;
   receiving a rate change request by said first DSL device from said second DSL device, said rate change request including said second data rate; and
   re-synchronizing with said second DSL device at said second data rate;
   wherein each said message includes an opcode segment, a data field segment and a checksum segment, and wherein each said segment includes a plurality of data bits represented by an energy on-time or off-time.

39. The method of claim 38, wherein said negotiating step includes the steps of:
   receiving a first rate message from said second DSL device after said transmitting said probe response message; and
   transmitting a second rate message in response to said receiving said first rate message, said second rate message including said first data rate.

40. The method of claim 38, wherein said negotiating step includes the steps of:
   receiving a first rate message from said second DSL device after said transmitting said probe response message;
   transmitting a second rate message in response to said receiving said first rate message; and
   receiving a third rate message in response to transmitting said second rate message, said third rate message including said first data rate.

41. The method of claim 38 further comprising the step of gauging a line quality during the step of receiving said first probe signal.

42. The method of claim 41, wherein said step of gauging said line quality includes measuring an attenuation and a noise margin.

43. The method of claim 38, wherein said first probe signal is at one or more data rates.

44. The method of claim 43, wherein said first DSL device performs line quality measurements at said one or more data rates based on said first probe signal.

45. The method of claim 38, wherein said step of transmitting said probe response message occurs before said step of transmitting said second probe signal.

46. The method of claim 38, wherein said discovery message includes a device type.

47. The method of claim 38, wherein said discovery message includes a payload type.

48. The method of claim 38 further comprising the step of transmitting a line quality measured by said first DSL device, prior to said step of receiving said rate change request, wherein said second DSL device uses said line quality to determine said second data rate.

49. The method of claim 48 further comprising the step of receiving a request for said line quality from said second DSL device, prior to said transmitting said line quality.

50. The method of claim 38, wherein said energy on-time for a first predetermined period of time indicates a "1" data bit and said energy off-time for a second predetermined period of time indicates a "0" data bit.

51. The method of claim 50, wherein said energy on-time includes scrambled two level ones.

52. The method of claim 50, wherein said energy on-time for about 50 ms indicates a "1" data bit and said energy off-time for about 50 ms indicates a "0" data bit.

53. A method of switching a first data rate to a second data rate in a communication system including a first DSL device and a second DSL device, said method comprising the steps of:

receiving a probe message by said first DSL device from said second DSL device;

receiving a first probe signal from said second DSL device following said receiving said probe message;

transmitting a probe response message to said second DSL device in response to said receiving said first probe signal;

synchronizing with said second DSL device at said first data rate determined by said second DSL device;

receiving a rate change request by said first DSL device from said second DSL device, said rate change request including said second data rate; and re-synchronizing with said second DSL device at said second data rate;

wherein each said message includes an opcode segment, a data field segment and a checksum segment, and wherein each said segment includes a plurality of data bits represented by an energy on-time or off-time.

54. The method of claim 53 further comprising the step of receiving a second probe signal after the step of receiving said first probe signal, wherein said first probe signal is at said first data rate and said second probe signal is at a third data rate.

55. The method of claim 53, wherein said first DSL device measures an attenuation based on said first probe signal.

56. The method of claim 53, wherein said first DSL device measures a noise margin based on said first probe signal.

57. The method of claim 53 further comprising the step of transmitting a line quality measured by said first DSL device, prior to said step of receiving said rate change request, wherein said second DSL device uses said line quality to determine said second data rate.

58. The method of claim 57 further comprising the step of receiving a request for said line quality from said second DSL device, prior to said transmitting said line quality.

59. The method of claim 53, wherein said energy on-time for a first predetermined period of time indicates a "1" data bit and said energy off-time for a second predetermined period of time indicates a "0" data bit.

60. The method of claim 59, wherein said energy on-time includes scrambled two level ones.

61. The method of claim 59, wherein said energy on-time for about 50 ms indicates a "1" data bit and said energy off-time for about 50 ms indicates a "0" data bit.

62. A communication device comprising:

a transmitter;

a receiver; and a line quality module;

wherein said receiver receives a probe message, said receiver receives a probe signal, said line quality module measures a first line quality based on said probe signal, said transmitter transmits a probe response message including said first line quality, said communication device synchronizes with a remote device at said first data rate determined by said remote device based on said first line quality, said receiver receives a data rate change request, including a second data rate, and wherein said communication device re-synchronizes with said remote device at said second data rate, and wherein each said message includes an opcode segment, a data field segment and a checksum segment, and wherein each said segment includes a plurality of data bits represented by an energy on-time or off-time.

63. The communication device of claim 62, wherein said first line quality module measures an attenuation and a noise margin.

64. The communication device of claim 62, wherein said transmitter transmits a second line quality measured by said communication device, before said receiver receives said data rate change request, and wherein said second data rate is based on said second line quality.

65. The communication device of claim 64, wherein said receiver receives a request for said line quality from said remote device, before said transmitter transmits said second line quality.

66. The device of claim 62, wherein said energy on-time for a first predetermined period of time indicates a "1" data bit and said energy off-time for a second predetermined period of time indicates a "0" data bit.

67. The device of claim 66, wherein said energy on-time includes scrambled two level ones.

68. The device of claim 66, wherein said energy on-time for about 50 ms indicates a "1" data bit and said energy off-time for about 50 ms indicates a "0" data bit.

* * * * *